(12) United States Patent  (10) Patent No.: US 8,790,787 B2
Niederst  (45) Date of Patent: Jul. 29, 2014

(54) COATING PROCESS

(71) Applicant: Valspar Sourcing, Inc., Minneapolis, MN (US)

(72) Inventor: Jeffrey Niederst, Minneapolis, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 13/782,538

(22) Filed: Mar. 1, 2013

(65) Prior Publication Data

US 2013/0177711 A1    Jul. 11, 2013

Related U.S. Application Data

(62) Division of application No. 12/445,725, filed as application No. PCT/US2007/081401 on Oct. 15, 2007, now abandoned.

(60) Provisional application No. 60/829,638, filed on Oct. 16, 2006.

(51) Int. Cl.
*B32B 15/09* (2006.01)
*B32B 15/08* (2006.01)
*B32B 15/18* (2006.01)

(52) U.S. Cl.
USPC ............ 428/458; 525/425; 525/437; 525/444

(58) Field of Classification Search
USPC .......... 428/34.1, 35.7, 35.8, 35.9, 36.92, 458; 525/425, 437, 444
See application file for complete search history.

(56) References Cited

U.S. PATENT DOCUMENTS

| 4,069,278 | A | 1/1978 | Borman et al. |
| 4,132,707 | A | 1/1979 | Borman |
| 4,147,738 | A | 4/1979 | Borman |
| 4,403,090 | A | 9/1983 | Smith |
| 4,418,188 | A | 11/1983 | Smith et al. |

(Continued)

FOREIGN PATENT DOCUMENTS

| EP | 1 378 344 A1 | 1/2004 |
| EP | 1 690 677 A1 | 8/2006 |

(Continued)

OTHER PUBLICATIONS

Bohman, "Molecular Weight-Viscosity Relationships for Poly (1,4-butylene Terephthalate)," Journal of Applied Polymer Science, vol. 22 (1978), pp. 2119-2126.*

(Continued)

*Primary Examiner* — Kara Boyle
(74) *Attorney, Agent, or Firm* — IPLM Group, P.A.

(57) ABSTRACT

A thermoplastic polymer advanceable by solid state polymerization is blended with at least one dissimilar thermoplastic polymer, or an organic or inorganic particulate filler. The blend is solid state polymerized to provide a modified polymer alloy or filled polymer blend having at least one physical or chemical property different from that of the blend before solid state polymerization. A substrate is coated with an adherent layer of the modified polymer alloy or filled polymer blend. The modified polymer alloy or filled polymer blend may also be coextruded with a layer of thermoplastic extrusion polymer having a melt viscosity similar to that of the modified polymer alloy or filled polymer blend and applied to a substrate to form an adherent coating.

14 Claims, 5 Drawing Sheets

(56) References Cited

U.S. PATENT DOCUMENTS

| | | | |
|---|---|---|---|
| 4,424,337 | A | 1/1984 | Smith et al. |
| 4,551,368 | A | 11/1985 | Smith et al. |
| 4,590,259 | A | 5/1986 | Kosky et al. |
| 4,643,925 | A | 2/1987 | Smith et al. |
| 4,753,832 | A * | 6/1988 | Brown et al. ............ 428/34.2 |
| 4,778,858 | A | 10/1988 | Ginnings |
| 4,891,406 | A | 1/1990 | Bittscheidt et al. |
| 5,243,020 | A | 9/1993 | Ghisolfi |
| 5,307,934 | A | 5/1994 | Hagner |
| 5,382,628 | A | 1/1995 | Stewart et al. |
| 5,412,024 | A | 5/1995 | Okada et al. |
| 5,663,281 | A | 9/1997 | Brugel |
| 5,725,944 | A * | 3/1998 | Jones et al. ............ 428/336 |
| 5,852,134 | A | 12/1998 | Al Ghatta |
| 6,153,264 | A | 11/2000 | Schmid et al. |
| 6,210,769 | B1 | 4/2001 | DiPede et al. |
| 2005/0100749 | A1 | 5/2005 | Hu et al. |
| 2006/0030678 | A1 | 2/2006 | Brown et al. |
| 2010/0279130 | A1 | 11/2010 | Niederst |

FOREIGN PATENT DOCUMENTS

| | | |
|---|---|---|
| JP | H04-306582 | 10/1992 |
| JP | 05-086277 A | 4/1993 |
| JP | H06-36859 | 2/1994 |
| JP | H09-104091 | 4/1997 |
| JP | H11-010723 | 1/1999 |
| JP | 2001-226569 | 8/2001 |
| JP | 2001-246695 | 9/2001 |
| JP | 2002-234571 | 8/2002 |
| JP | 2003-231230 | 8/2003 |
| JP | 2004-114476 | 4/2004 |
| JP | 2004-314570 | 11/2004 |
| JP | 2004-351927 | 12/2004 |
| JP | 2005/306419 | 11/2005 |

OTHER PUBLICATIONS

Dictionary.com definition for "Coat", retrieved on Sep. 15, 2012 from http://dictionary.reference.com.

Dictionary.com definition for "Coating", retrieved from the Internet Archive for Apr. 4, 2005 (see http://web.archive.org/web/20050404045240/http://dictionary.reference.com/search?q=coating).

Papadopoulou et al., "Compatibiltiy behavior of blends of poly(ethylene terephthalate) with an amorphous copolyester", Polymer vol. 38, No. 3, pp. 631-637 (1997).

U.S. Pharmacopeia, Polyethylene Terephthalate Bottles and Polythethlyene Terephthalate G. Bottles, retrieved from the Internet Archive for Nov. 27, 2010 (see http://wayback.archive.org/web/20101101000000*/http://pharmacopeia.cn/v29240/usp29nf24s0__c661s51.html).

Eastman Eastar™ 6763 Product Data Sheet (2008).

Jansen, Martinus, A.G., "Modification of poly (butylenes terephthalate) by incorporation of comonomers in the solid state", 168 pages, (2005).

McKetta et al., Encyclopedia of Chemical Processing and Design, p. 7, Alkyd (1999).

Fosh Glossary, Aramide, 2 pages, retrieved on Jul. 5, 2011 from: http://www.fosh.com.my/glossary.html.

Closeup on Technology—Recycled PET/PE Alloys Show Promise in Monofilament, Pallets, Pipe, *Plastics Technology Online* (May 2004) [downloaded from the Internet Archive entry for Jan. 20, 2005, at http://web.archive.org/web/20050120191049/http://www.ptonline.com/articles/200405cu1.html], 2 pages.

Erema® High Tech Recycling brochure entitled "PET Extrusion System Vacurema", 6 pages (Oct. 2004).

Petcore Pet Container Recycling Europe brochure entitled "Amosorb copolyester, Best Packaging by bp", vol. 3, No. 1, 4 pgs. (Apr. 2001).

Malloy, Robert, "Potential End Uses for Polyester Fiber Waste: A Laboratory Study", Chelsea Center for Recycling and Economic Development, University of Massachusetts Lowell, Technical Report #33, 13 pages (Oct. 2000).

Davis, Scott P., "PET Resin SSP Market and Technology Trends", UOP Sinco™ Polyester 2003 Conference, Zurich Switzerland, 27 pages (Dec. 1, 2003).

Erema® Recycling News, "Vacurema PET-Success Stories" (Edition 2004/2005), 4 pages.

Gottfert Inc., Detection of the Intrinsic Viscosity (IV), 8 pages, (2008).

* cited by examiner

COATING PROCESS

CROSS REFERENCE TO RELATED APPLICATION

This application is a divisional of U.S. patent application Ser. No. 12/445,725 filed on Apr. 15, 2009 as a National Stage filing of International Application No. PCT/US2007/081401, filed on Oct. 15, 2007, which claims priority under 35 U.S.C. 119(e) to U.S. Provisional Application No. 60/829,638 filed on Oct. 16, 2006 by Jeffrey Niederst, and entitled "Coating Process and Article," the disclosures of which are incorporated herein by reference in their entirety.

TECHNICAL FIELD

This invention relates to thermoplastic coatings.

BACKGROUND

It sometimes is difficult to prepare thermoplastic coatings having an adequate balance of properties. Thermoplastic coatings may require one or more potentially conflicting features such as adequate adhesion to an underlying substrate or other neighboring surface; coextrudability with another coating composition; oil-repellence, water-repellence, lubricity or other surface-related properties; storage stability; strength; impact resistance or elasticity; chemical, abrasion or weathering resistance; low cost; or other desired properties. Sometimes a single material will suffice for a given application, but often a single material will not have all necessary properties. Most commercial thermoplastic suppliers emphasize production of large volume products and may be unwilling or unable to provide small volume, specialty thermoplastics with custom-specified properties. End users seeking thermoplastic polymers with unique performance attributes may have to blend together two or more commercially available products, form multilayer laminates, add specialty ingredients, or take other potentially costly and time-consuming measures to obtain needed attributes. For example, in order to obtain an acceptable container coating, a multilayer coating may need to be formed using a suitable container-adherent layer adjacent the container substrate and a suitable protective layer adjacent the eventual container contents. Unless the various layers have similar melt viscosities it can be difficult to co-apply these various layers using coextrusion equipment.

SUMMARY OF THE INVENTION

We have found that dissimilar polymers, or a polymer and a filler, may be melt-blended and the blend thereafter subjected to solid state polymerization to provide a modified polymer alloy or filled polymer blend having one or more properties that may be superior to those of the source polymer(s), a simple blend of the source polymers, or a blend of the source polymer and filler. Without intending to be bound by theory, the solid state polymerization process may rearrange blocks or segments of the source polymer(s) to provide a new polymer alloy or filled polymer blend having unique properties. The resulting modified polymer blend may be used to prepare specialty coatings that might be difficult to prepare from commercially available thermoplastic polymers.

We have also found that such polymer alloy or filled polymer blends may be used to make coextruded multilayer coatings that might otherwise be difficult to form by coextrusion. Successful thermoplastic polymer coextrusion at commercially desirable extrusion rates can be difficult unless the individual layers have similar melt viscosities, e.g., melt viscosities within about ±15% of one another at a chosen extrusion temperature and extrusion rate. The disclosed modified polymer alloy or filled polymer blends may be coextruded with a thermoplastic polymer whose melt viscosity has a given value at a chosen extrusion temperature and extrusion rate, by melt-blending dissimilar polymers or a polymer and a filler to form a blend having a lower melt viscosity than the given value, subjecting the blend to solid state polymerization to provide a modified polymer alloy or filled polymer blend whose melt viscosity is sufficiently close to the given value so that the modified polymer alloy or filled polymer blend and the thermoplastic polymer may be coextruded, and coextruding layers of the modified polymer alloy or filled polymer blend and thermoplastic polymer onto a substrate to form an adherent coating.

The present invention thus provides, in one aspect, a process for coating a substrate with an adherent coating comprising:
  a) providing a thermoplastic polymer advanceable by solid state polymerization;
  b) blending the thermoplastic polymer with:
    i) at least one dissimilar thermoplastic polymer, or
    ii) an organic or inorganic particulate filler;
  c) solid state polymerizing the advanceable thermoplastic polymer to provide a modified polymer alloy or filled polymer blend having at least one physical or chemical property different from that of the blend before solid state polymerization; and
  d) coating the substrate with an adherent layer of the modified polymer alloy or filled polymer blend.

In another aspect the present invention provides a process for applying an adherent multilayer coating to a substrate comprising:
  a) providing a first thermoplastic polymer whose melt viscosity has a given value at a chosen temperature and extrusion rate;
  b) providing a second thermoplastic polymer advanceable by solid state polymerization and having a melt viscosity at the chosen temperature and extrusion rate sufficiently unlike the given value so that the first and second thermoplastic polymers can not be coextruded;
  c) blending the second thermoplastic polymer with:
    i) at least one dissimilar thermoplastic polymer, or
    ii) an organic or inorganic particulate filler;
  d) solid state polymerizing the second thermoplastic polymer to provide a modified polymer alloy or filled polymer blend whose melt viscosity at the chosen temperature and extrusion rate is sufficiently close to the given value so that the modified polymer alloy or filled polymer blend and the first thermoplastic polymer may be coextruded; and
  e) coextruding a layer of the modified polymer alloy or filled polymer blend and a layer of the first thermoplastic polymer onto the substrate to form an adherent coating.

The present invention provides, in another aspect, a coated article comprising a substrate having adhered thereto one or more polymeric layers, wherein at least one layer comprises a modified polymer alloy or filled polymer blend comprising a thermoplastic polymer and (i) at least one dissimilar polymer or (ii) an organic or inorganic particulate filler, wherein the thermoplastic polymer has been advanced by solid state polymerization and the blend has a melt viscosity greater than that of the blend before solid state polymerization.

DETAILED DESCRIPTION

Figure 1:
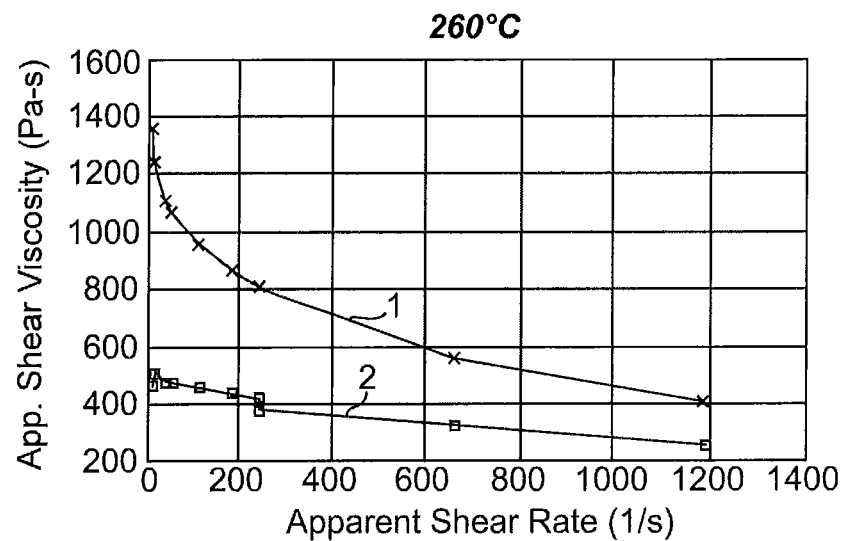
FIG. 1 is a graph of apparent shear viscosity vs. apparent shear rate at 260° C. for a conventional thermoplastic polymer and a thermoplastic polymer blend, as employed in Comparative Example 1.

The term "polymer" includes homopolymers, copolymers and ter- and higher polymers, having random, block, graft or other backbone arrangements. The phrase "dissimilar polymers" refers to polymers whose backbones contain an arrangement of different materials (e.g., polymers of different monomers) and to polymers whose backbones contain different arrangements of the same materials (e.g., random and block copolymers of the same monomers). The phrase "similar polymers" refers to polymers whose backbones contain the same arrangement of the same materials. For example, the backbones in polyethylene terephthalate ("PET") and polyethylene ("PE") are arrangements of different monomers, and PET and PE are dissimilar polymers. Virgin PET and recycled PET are polymers whose backbones contain the same arrangement of the same materials, but which typically differ in chain lengths and acid numbers. Virgin PET and recycled PET are similar polymers.

The term "adherent" when used with respect to a coating or layer on a substrate means that the coating will fracture if peeled away from the substrate at a right angle.

The term "advanceable" when used with respect to a polymer refers to a polymer whose weight average molecular weight can be increased by solid state polymerization.

The terms "blend" and "blending" refer to any process that combines two or more polymers, or a polymer and an organic or inorganic filler, into a mixture that is at least macroscopically homogenous, and to such a mixture. The term "melt-blending" refers to any blending process carried out at or above the melting temperature (Tm) of at least one of the polymers in a blend of polymers.

The phrases "solid state polymerization" and "solid state polymerizing" refer to a process which through the application of heat furthers the polymerization (e.g., increases the intrinsic viscosity) of a polymer while in solid form.

The disclosed process includes an advanceable thermoplastic polymer. A variety of advanceable polymers may be employed. Representative advanceable polymers include condensation polymers and addition polymers, with condensation polymers being preferred. Alkyd polyesters made using by reacting together one or more acid anhydrides, polyols and unsaturated fatty acids, or made by transesterifying a mixture of one or more polyols and oils, may also be employed. Representative fatty acids include dehydrated castor fatty acids, linolenic fatty acids, ricinoleic fatty acids soya fatty acids, and the like; and byproducts and combinations thereof. Representative oils include vegetable oils such as canola oil, castor oil, dehydrated castor oil, coconut oil, corn oil, cottonseed oil, ground nut oil, linseed oil, peanut oil, ricinene oil, safflower oil, soybean oil, sunflower oil, tall oil, tung oil, walnut oil, wood oil, and the like; animal fats such as fish oil, lard, poultry fat, tallow, and the like; and byproducts and combinations thereof. Other advanceable polymers include polyesters and copolyesters such as PET, polybutylene terephthalate ("PBT"), polyethylene naphthalate ("PEN"), polybutylene naphthalate ("PBT") and other esters of acids and diols that will be familiar to persons having ordinary skill in the art; polylactones such as polycaprolactone; polymethyl methacrylate ("PMMA"); styrene/maleic anhydride ("SMA"); polyoxymethylene ("POM"); ketones such as polyetheretherketone ("PEEK") and polyaryletherketone ("PAEK"); thermoplastic fluoropolymers; polycarbonate ("PC"); polyurethanes; polyarylate ("PAR"); polyphenylene oxide ("PPO"); polyamides such as nylon 6, nylon 6,6, nylon 11, nylon 6,12 and nylon 12; imides such as polyimide ("PI"), polyetherimide ("PEI") and polyamideimide ("PAI"); polyphthalamide; sulfones such as polysulfone ("PSul"; polyarylsulfone ("PAS") and poly ether sulfone ("PES"); polyaminoacids; polydimethylsiloxanes; mixtures thereof; and derivatives thereof which do not interfere with solid state polymerization (e.g., appropriately substituted polymers such as halogen-substituted polymers). The disclosed blends may also include (but do not have to include) a non-advanceable polymer. Representative non-advanceable polymers that may be blended with the advanceable polymer include polyolefins such as polyethylene ("PE"), polypropylene ("PP") and polybutylene ("PB"); styrenes such as polystyrene ("PS"), poly α-methyl styrene and styrene/acrylonitrile ("SAN"); vinyls such as polyvinyl chloride ("PVC") and polyvinylnaphthalene ("PVN"); and mixtures thereof. Representative mixtures of advanceable polymers and non-advanceable polymers include mixtures of esters and olefins (for example, PET and polyethylene). Preferably all of the polymers in a blend of dissimilar polymers are thermoplastic, and more preferably all of the polymers in a blend of dissimilar polymers are advanceable thermoplastics. However, blends containing thermoplastic and non-thermoplastic (e.g., thermoset) polymers may be employed if desired.

Blends containing the disclosed polymers may be combined in a variety of ratios and in any desired order. For example, a blend of first and second dissimilar polymers may contain from about 99 to about 1 weight percent of a first polymer and from about 1 to about 99 weight percent of a second polymer, from about 95 to about 5 weight percent of a first polymer and from about 5 to about 95 weight percent of a second polymer, from about 90 to about 10 weight percent of a first polymer and from about 10 to about 90 weight percent of a second polymer, or from about 80 to about 20 weight percent of a first polymer and from about 20 to about 80 weight percent of a second polymer. More than two (for example, three or more, four or more or five or more) dissimilar polymers may be combined to make the disclosed blends.

The dissimilar polymers typically will differ with respect to at least one or more physical or chemical properties. Representative such properties may include molecular weight, density, glass transition temperature (Tg), melting temperature (Tm), intrinsic viscosity (IV), melt viscosity (MV), melt index (MI), crystallinity, arrangement of blocks or segments, availability of reactive sites, reactivity with respect to various gases or liquids, acid number, surface energy, hydrophobicity, oliophobicity, moisture or oxygen permeability, transparency, heat resistance, resistance to sunlight or ultraviolet energy, adhesion to substrates including metals or plastics, and recyclability. Melt viscosity is an especially useful property that can be varied by subjecting a blend of dissimilar polymers to solid state polymerization, thereby enabling preparation of desirable polymer alloys from dissimilar polymers whose melting points differ by, for example, more than about ±50%, more than about ±10%, or more than about ±5% at temperatures of about 200-300° C. and shear rates of about 50-500 Pa-sec. For properties measured on an absolute scale, the dissimilar polymer properties may for example differ by about ±5%, by about ±10%, by about ±15%, by about ±25%, by about ±50%, or by about ±100% or more. The dissimilar polymers may be in any convenient form including flakes, pellets, powder or a melt. The dissimilar polymers may optionally be dried prior to being blended. Drying may also in some instances be advantageously avoided, thus enabling an appreciable saving in processing time and equipment cost.

The disclosed advanceable thermoplastic polymer may instead or also be blended with an organic or inorganic particulate filler. A variety of organic fillers may be employed, including polymeric particles (e.g., polymeric nanoparticles), micronized organic polymers such as micronized polytetrafluoroethylene, hydrogels, core-shell polymer systems, sheathed polymer systems and other organic fillers that will be familiar to persons having ordinary skill in the art. A variety of inorganic fillers may be employed, including metal oxides such as titanium dioxide, silicon dioxide, iron oxide, zinc oxide, antimony oxide and zirconium oxide (including metal oxide nanoparticles); metal sulfides and metal sulfates such as cadmium sulfide, zinc sulfide, barium sulfate, and lithopone; metal nitrides such as boron nitride; metal oxychlorides such as bismuth oxychloride; earth compounds including clays such as sienna or umber (including clay nanoparticles); calcium carbonate; talc; wollastonite; and other inorganic fillers that will be familiar to persons having ordinary skill in the art. The disclosed advanceable thermoplastic polymer and filler may be combined in a variety of ratios. For example, a blend of polymer and filler may contain from about 15 to about 99.9 weight percent polymer and from about 85 to about 0.1 weight percent filler, from about 30 to about 99.9 weight percent polymer and from about 70 to about 0.1 weight percent filler, or from about 50 to about 99.9 weight percent polymer and from about 50 to about 0.1 weight percent filler. As one example, pigmented films are sometimes requested by can coaters, particularly for food packaging where a bright, white coloration implies a sanitary, clean environment conducive to the marketing of food-related products. A suitably white coating may be obtained, for example, by adding a whitening agent such as titanium dioxide within one or all of the coating layers. High pigment levels may be needed (e.g., 40 weight percent or more) in order to achieve the necessary optical properties and performance.

The disclosed blends of dissimilar polymers or of a polymer and filler may contain one or more adjuvants. Representative adjuvants include surfactants, defoamers, wetting agents, leveling agents, pH modifiers, solvents, antimicrobial agents, UV absorbers, light stabilizers, antioxidants, fragrances and adhesion promoters. These and other useful adjuvants will be apparent to persons having ordinary skill in the art.

The disclosed blends may be combined using equipment and techniques that will be familiar to persons having ordinary skill in the art. Melt-blending is preferred but not required. The blend desirably is homogeneous but homogeneity is not required. One convenient method for blending dissimilar polymers or a polymer and filler is to combine the ingredients in an extruder, e.g., a single screw or multiple screw extruder. The extruder may be heated at one or more locations along its length, e.g., to a temperature above that of the Tm of at least one and preferably all of the dissimilar polymers in the blend.

The blend may be finely divided (e.g., pelletized, granulated or made into flakes, using equipment and techniques that will be familiar to persons having ordinary skill in the art) before the blend is solid state polymerized. The finely divided blend may if desired be stored until such time as it can be solid state polymerized, and may if desired be subjected to an optional intermediate step such as heating or cooling to promote crystallization.

Solid state polymerization may be performed using equipment and techniques that will be familiar to persons having ordinary skill in the art. One convenient method is to place the pelletized blend in a suitable sealed vessel heated to a temperature below the melting point of the blend or below the melting point of the major component thereof (e.g., to a temperature of about 150 to about 250° C., about 170 to about 220° C. or about 180 to about 210° C.), in an inert or nonreactive atmosphere (e.g., argon or nitrogen) for a time sufficient to provide a modified polymer alloy or filled polymer blend having at least one physical or chemical property different from that of the unmodified blend. Such time may for example be about 2 to about 24 hours, about 5 to about 20 hours or about 8 to about 16 hours.

The resulting modified polymer alloy or filled polymer blend may be applied to a variety of rigid or flexible solid or plated substrates, including steel (e.g., tin-free steel, tin-plated steel and galvanized steel), aluminum (e.g., aluminum plate and aluminum foil), tin, zinc, plastics, wood products (e.g., paper, paperboard, waxed paperboard, fiberboard), cementboard and other substrates that will be familiar to persons having ordinary skill in the art. The coated substrates may be used for a variety of purposes including containers and other packaging materials, building products, vehicles and other purposes that will be familiar to persons having ordinary skill in the art. When so used, the coated substrates may need to meet various performance standards that will be familiar to persons having ordinary skill in the art. For example, when used to form lined steel containers for fish such as albacore tuna, salmon and the like, the container may need to survive sterilization (e.g., exposure to pressurized steam at 1 atmosphere and 121° C. for 90 minutes) and provide acceptable shelf life (e.g., 12-24 months).

Figure 8:
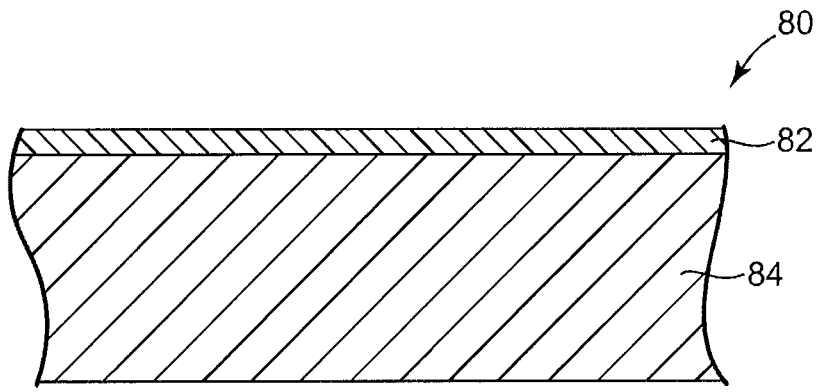
FIG. 8 through FIG. 10 are schematic cross-sectional views of adherent thermoplastic coatings on various substrates.
Figure 9:
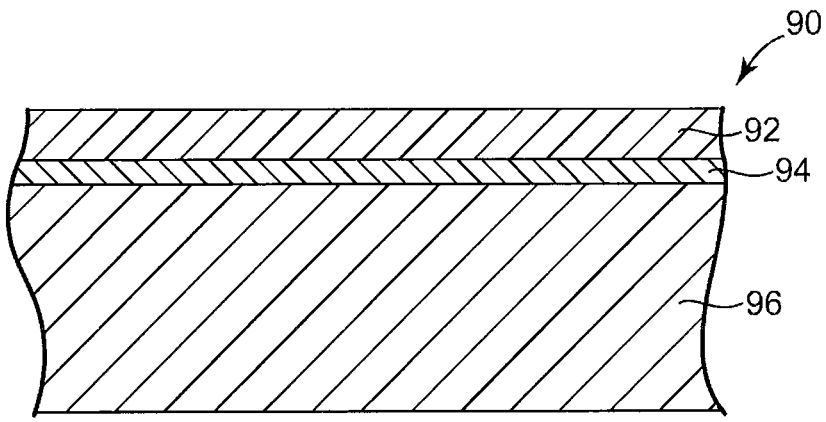
Figure 10:
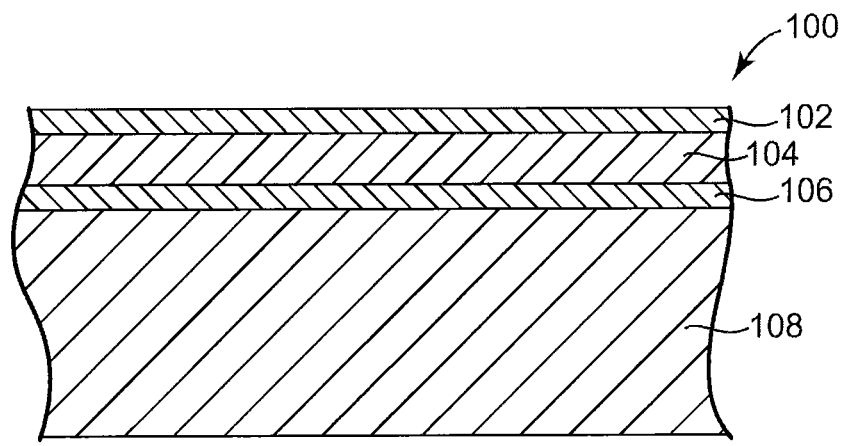

A single layer of the modified polymer alloy or filled polymer blend may be applied to the substrate, thereby providing a coated article like article 80 in FIG. 8, in which a thin layer 82 of modified polymer alloy or filled polymer lies atop and is adhered to substrate 84. In the illustrated embodiment, substrate 84 is a plastic substrate, but as will be appreciated by persons having ordinary skill in the art, substrate 84 could be made from a variety of materials. Multiple layers of the modified polymer alloy or filled polymer blend may also be applied to the substrate, as may be one or more layers of the modified polymer alloy or filled polymer blend together with one or more layers of a dissimilar polymer. For example, the resulting coated article might be like article 90 in FIG. 9, in which a thicker layer 92 of unmodified polymer lies atop a thinner layer 94 of modified polymer alloy or filled polymer which in turn lies atop and is also adhered to substrate 96. The resulting coated article might also be like article 100 in FIG. 10, in which a thinner layer 102 of modified polymer alloy or filled polymer blend lies atop thicker layer 104 of unmodified polymer which in turn lies atop a thinner layer 106 of modified polymer alloy or filled polymer and substrate 108. Persons having ordinary skill in the art will appreciate that other numbers and arrangements of the disclosed layers are possible. In the illustrated embodiments in FIG. 9 and FIG. 10, substrate 84 is a plastic substrate, but as will be appreciated by persons having ordinary skill in the art, substrate 84 could be made from a variety of materials. The coated substrate may thus bear a single layer, two layers, three layers, four layers, five layers or even more layers (e.g., ten or eleven layers). The polymeric layers may have a variety of thicknesses, e.g., a thickness of about 1 micrometer to about 10 millimeters, about 1 micrometer to about 1 millimeter, or about 1 micrometer to about 100 micrometers. The layers may be applied serially or all at once. For example, the modified polymer alloy or filled polymer blend may be extruded together with a dissimilar thermoplastic extrusion polymer whose melt viscosity at the desired extrusion temperature and extrusion rate is sufficiently close to that of the modified polymer alloy or filled polymer blend so that both may be coextruded at the same time. A variety of dissimilar thermoplastic extrusion polymers may be employed, including the various thermoplastic polymers mentioned above. The dissimilar thermoplastic extrusion polymer may be different from or the same as any polymer in the modified polymer alloy or filled polymer blend. For example, the dissimilar thermoplastic extrusion polymer may be the same as the higher-melting of two dissimilar polymers in a binary polymer alloy.

The melt viscosities of the individual layers desirably are within about ±15%, ±10% or ±5% of one another at the chosen extrusion temperature and extrusion rate. If the melt viscosity and hence the flow rate of one or more of the coextruded layers is substantially different from that of another coextruded layer, the applied coating may display one or more film forming or film application deficiencies, thereby resulting in poor appearance or performance. We have observed that coextrusion systems with very closely matched layer viscosity values display higher quality film forming or film application properties. When typical commercially available polymers are employed in such a coextrusion system, the selection of materials which match a given viscosity requirement may be quite limited. Thus existing coextrusion systems may employ layers of materials having not only very closely matched melt viscosities but also very similar other physical and chemical properties as well. Such systems may not provide broad performance characteristics and may tend to perform more like a thick monolayer of a single material than like a true multilayer system.

Formulators have also sought to broaden the performance properties of coextruded films by blending multiple materials in a given layer or layers. Such blending is intended to provide a mixture of chemical or physical properties that cannot be achieved in one layer. The layer formulation may for example contain two or more materials that are typically pre-blended (pre-compounded) and then added to the film forming equipment to provide a single distinct layer. We have observed that pre-compounding can deleteriously affect the viscosity of the blended materials, due perhaps to the effects of mechanical shear, heat, moisture or other factors encountered during the pre-compounding process. For example, when two materials with very similar melt viscosities are pre-compounded, the resulting blend may have a much lower melt viscosity than that of either starting material. Such reduced melt viscosity can dramatically limit the extent to which coextruded films can be formed using pre-compounded blends of materials in a layer. A similar reduction in melt viscosity may be observed when a polymer and a particulate filler are pre-compounded.

The disclosed processes enable the fabrication of proprietary polymer alloys and filled polymer blends possessing properties not available from commercially supplied products. One or more properties of the polymer alloy may for example be unavailable in or superior to a corresponding property of the neat starting materials or a simple blend thereof. The disclosed processes thus permit several starting materials to be combined via a melt compounding process to form a single, solid pellet that may have some properties desired by an end user in a final product, but which may lack other properties (for example, a suitable melt flow rate) also needed in such final product. The pellet's properties can be modified using solid state polymerization to provide a modified polymer alloy or filled polymer blend having more satisfactory overall properties and better compatibility with other layers in a coextrusion system.

The invention is further illustrated in the following non-limiting examples, in which all parts and percentages are by weight unless otherwise indicated.

Comparative Example 1

Blended First and Second Polymers

Pre-dried samples (moisture <100 ppm, by Karl-Fischer analysis) of KOSA™ 1101E fast-crystallizing PET ("CPET", from Invista) and DYNAPOL™ P1500HV partially crystalline copolyester (from Degussa) were combined in a 50:50 ratio, compounded in a ZSK twin-screw extruder (from Werner & Pfleiderer) and pelletized into small, cylindrical pellets. KOSA 1101E CPET is a bottle grade, 0.8 intrinsic viscosity (IV) thermoplastic polymer. It is fairly hard and durable but has relatively low adhesion to substrates such as tin-free steel. DYNAPOL P1500HV copolyester resin is a soft, adhesive resin having better adhesion to substrates such as tin-free steel but having a much lower melt viscosity than KOSA 1101E CPET.

The pelletized blend was dried (moisture <100 ppm, by Karl-Fischer analysis) using a CONAIR™ dryer from Conair Corp and analyzed for melt viscosity at 260° C. using a DYNISCO™ LCR7000 capillary rheometer. A reference sample of dried KOSA 1101E CPET was also analyzed. FIG. 1 shows viscosity versus shear curves for the reference sample (curve 1) and for the blend (curve 2). Set out below in Table 1 is a comparison of melt flow rates, shear viscosities and adhesion to tin-free steel for the reference sample and for the blend. Adhesion was evaluated on a qualitative basis using a 0-10 scale with 10 corresponding to 100% adhesion.

TABLE 1

| | Reference (100% KOSA 1101E CPET; Curve 1) | Blend (50% KOSA 1101E CPET/50% DYNAPOL P 1500HV; Curve 2) | % Difference |
|---|---|---|---|
| Melt Flow Rate (g/10 min) | 6.245 | 15.951 | +155% |
| Viscosity (100 s−1) | 974 Pa-s | 460 Pa-s | −53% |
| Viscosity (200 s−1) | 819 Pa-s | 414 Pa-s | −49% |
| Viscosity (500 s−1) | 611 Pa-s | 339 Pa-s | −45% |
| Adhesion (Tin-Free Steel) | 7 | 10 | +40% |

Melt Viscosity Data (260° C.)

The data in Table 1 shows that inclusion in the blend of DYNAPOL P1500HV polymer significantly improved adhesion to tin-free steel. However, the blend melt viscosity was significantly lower than that of 100% KOSA PET, and well beyond the ±15% guideline for acceptable coextrusion. Thus despite its enhanced adhesion, the blend would not be useable as an adhesion layer adjacent to a layer of KOSA PET in a coextruded multilayer coating. These commercially available materials do not appear to have suitable properties to permit their use in a coextruded multilayer coating intended to adhere to tin-free steel.

Example 1

Blended First and Second Polymers Subjected to Solid State Polymerization

Figure 2:
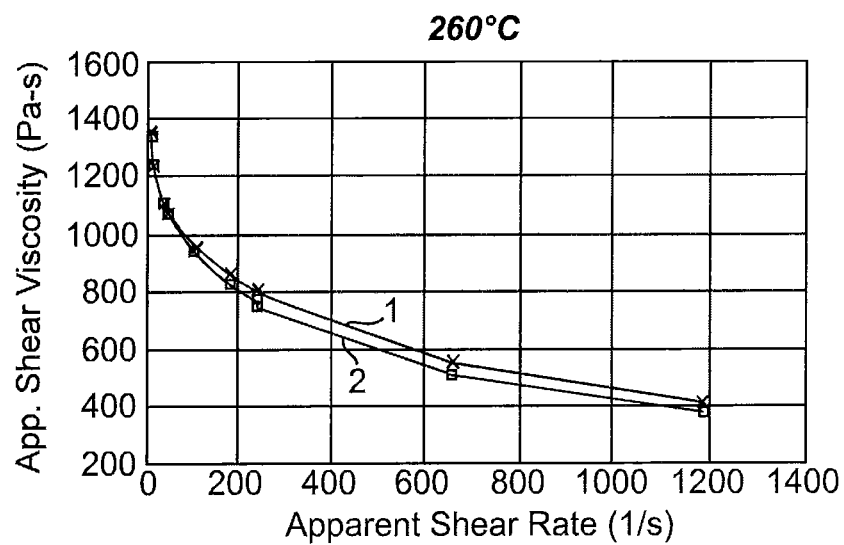
FIG. 2 is a graph of apparent shear viscosity vs. apparent shear rate at 260° C. for a conventional thermoplastic polymer and a solid state polymerized thermoplastic polymer blend, as employed in Example 1.

The Comparative Example 1 pelletized blend was subjected to solid state polymerization for 16 hours at 200° C. under a vacuum of about 760 mm Hg. The resulting polymer alloy pellets were dried and analyzed for melt viscosity using the method of Comparative Example 1. A reference sample of dried KOSA 1101E CPET was also analyzed. FIG. 2 shows viscosity versus shear curves for the reference sample (curve 1) and for the solid state polymerized blend (curve 2). Set out below in Table 2 is a comparison of melt flow rates, shear viscosities and adhesion to tin-free steel for the reference sample and for the solid state polymerized blend.

TABLE 2

Melt Viscosity Data (260° C.)

| | Reference (100% KOSA 1101E CPET; Curve 1) | Polymer Alloy (50% KOSA 1101E CPET/50% DYNAPOL P 1500HV; Curve 2) | % Difference |
|---|---|---|---|
| Melt Flow Rate (g/10 min) | 6.245 | 6.241 | −0.10% |
| Viscosity (100 s−1) | 974 Pa-s | 954 Pa-s | −2.1% |
| Viscosity (200 s−1) | 819 Pa-s | 789 Pa-s | −3.7% |
| Viscosity (500 s−1) | 611 Pa-s | 573 Pa-s | −6.2% |
| Adhesion (Tin-Free Steel) | 7 | 10 | +40% |

The data in Table 2 shows that solid state polymerization of the blend maintained the improved adhesion to tin-free steel observed in Comparative Example 1. Solid state polymerization also increased the observed melt viscosity sufficiently to meet melt viscosity guidelines for acceptable coextrusion.

Comparative Example 2

Three Layer Coextrusion System

Figure 3:
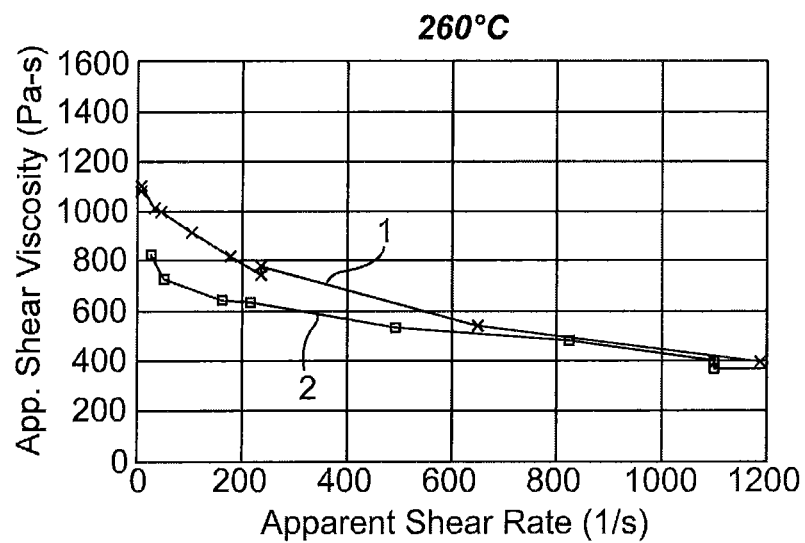
FIG. 3 is a graph of apparent shear viscosity vs. apparent shear rate at 260° C. for two conventional thermoplastic polymers, as employed in Comparative Example 2.

Samples of KOSA 1101E CPET (the 0.8 dl/g IV polyester used in Example 1) and EASTAR™ 6763 glycol-modified PET ("PETG", a 0.78 dl/g IV copolyester from Eastman Chemical Co.), were dried to a moisture value of about 50 ppm by Karl-Fischer analysis and tested for melt viscosity at 260° C. The results are set out in FIG. 3, which shows viscosity versus shear curves for KOSA 1101E CPET (curve 1) and for EASTAR™ 6763 PETG (curve 2). Based on the melt viscosity measurements, one might assume that layers of either material, or layers containing a blend of both materials, would exhibit sufficiently similar melt viscosity at a given temperature and shear rate so that they could be coextruded. The formulations shown below in Table 3 were prepared to test this assumption:

TABLE 3

| Layer | Thickness | Formulation |
|---|---|---|
| Top | 4 μm | 75% KOSA 1101E CPET + 25% EASTAR 6763 PETG |
| Middle | 12 μm | 100% KOSA 1101E CPET |
| Bottom | 4 μm | 25% KOSA 1101E CPET + 75% EASTAR 6763 PETG |

Figure 4:
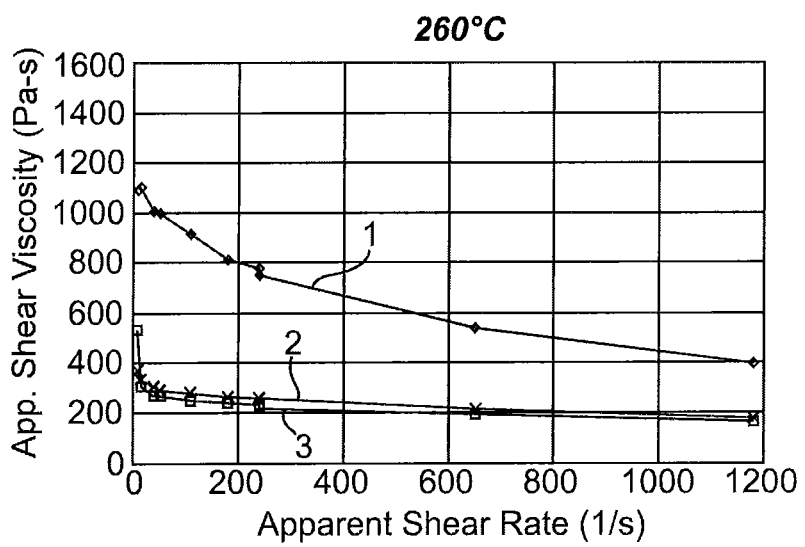
FIG. 4 is a graph of apparent shear viscosity vs. apparent shear rate at 260° C. for two pre-compounded blends of the thermoplastic polymers shown in FIG. 3.

The top and bottom layer formulations were pre-compounded by feeding pellets of the dried KOSA 1101E CPET and EASTAR 6763 PETG polymers to a commercial 75 mm twin screw extruder at a temperature of 265-280° C. The resulting extruded polymer blends were formed into pellets, allowed to crystallize, dried to a moisture value less than 50 ppm (by Karl-Fischer analysis) and tested for melt viscosity at 260° C. The results are set out in FIG. 4, which shows viscosity versus shear curves for the 100% KOSA 1101E CPET middle layer (curve 1), for the 75% KOSA 1101E CPET+25% EASTAR 6763 PETG top layer (curve 2), and for the 25% KOSA 1101E CPET+75% EASTAR 6763 PETG bottom layer (curve 3). The data shows that a very substantial reduction in the top and bottom layer melt viscosities occurred during the pre-compounding process and that the melt viscosity of the pre-compounded top and bottom layers would be well below that of the KOSA 1101E CPET middle layer. It would be difficult to carry out successful coextrusion of these three layers without encountering film forming or application deficiencies.

Example 2

Three Layer Coextrusion System with Solid State Polymerized Middle Layer

Figure 5:
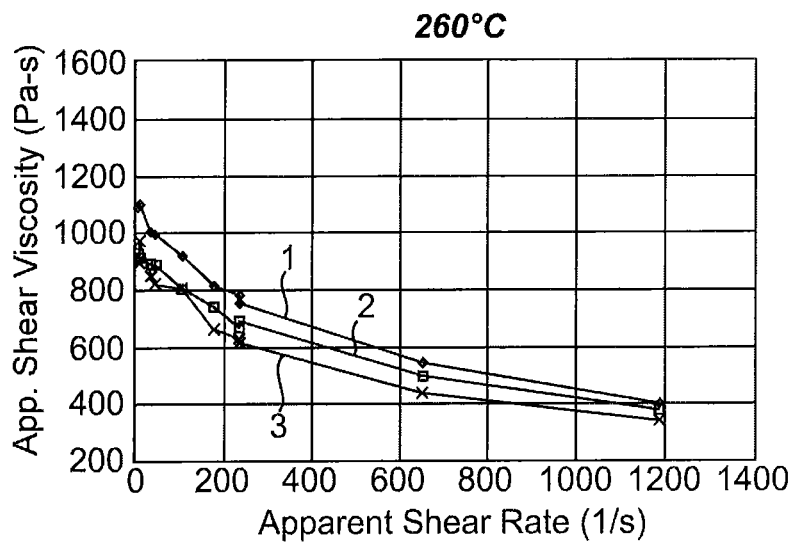
FIG. 5 is a graph of apparent shear viscosity vs. apparent shear rate at 260° C. for the blends shown in FIG. 4 and for one of the polymers in the blends after the blends have been solid state polymerized, as employed in Example 2.

Using the method of Example 1, the Comparative Example 2 pelletized pre-compounded blends were subjected to solid state polymerization for 12 hours at 200° C. under a vacuum of about 760 mm Hg. The resulting solid state polymerized polymer alloys were tested for melt viscosity at 260° C. The results are set out in FIG. 5, which shows viscosity versus shear curves for the 100% KOSA 1101E CPET middle layer (curve 1), for the solid state polymerized 75% KOSA 1101E CPET+25% EASTAR 6763 PETG top layer (curve 3), and for the solid state polymerized 25% KOSA 1101E CPET+75% EASTAR 6763 PETG bottom layer (curve 2). The data shows that the melt viscosities of the solid state polymerized top and bottom layer blends closely match the melt viscosity of the KOSA 1101E CPET middle layer, and that simultaneous coextrusion of all three layers together should be successful. This was verified by coextruding all three layers onto a continuous coil of tin-free steel. The coated steel was fabricated into shallow drawn fish cans with the coextruded layers forming an interior coating. The cans were packed with either pink salmon or albacore tuna, sterilized for 90 minutes at 121° C., stored in a 38° C. hot room for 18 months and opened to assess the coating performance. Cans coated using a commercial can coating formulation from Valspar Inc. were similarly evaluated for comparison purposes. Coating adhesion was assessed using a 0-100% Rating Scale in which a rating of 100% indicated no visual loss of adhesion. Staining, blushing and black sulfide buildup were visually evaluated as well. The results are shown below in Tables 4 and 5.

TABLE 4

Pink Salmon Pack

| Coating Variable | Commercial Coating | Example 2 Coextruded Coating |
|---|---|---|
| Adhesion | | |
| Lower Side Wall | 100% | 100% |
| Middle Side Wall | 100% | 100% |
| Upper Side Wall | 100% | 100% |
| Staining | | |
| Lower Side Wall | None | None |
| Middle Side Wall | None | None |
| Upper Side Wall | None | None |
| Blushing | | |
| Lower Side Wall | None | None |
| Middle Side Wall | None | None |
| Upper Side Wall | None | None |
| Black Sulfide Build Up/Location | None/None | None/None |

TABLE 5

Albacore Tuna Pack

| Coating Variable | Commercial Coating | Example 2 Coextruded Coating |
|---|---|---|
| Adhesion | | |
| Lower Side Wall | 100% | 100% |
| Middle Side Wall | 100% | 100% |
| Upper Side Wall | 100% | 100% |
| Staining | | |
| Lower Side Wall | None | None |
| Middle Side Wall | None | None |
| Upper Side Wall | Moderate | None |
| Blushing | | |
| Lower Side Wall | None | None |
| Middle Side Wall | None | None |
| Upper Side Wall | None | None |
| Black Sulfide Build Up/Location | Moderate/Headspace | None |

The data in Tables 4 and 5 shows that the coextruded three-layer film of this Example 2 could successfully be applied to a rigid tin-free steel substrate, formed into cans, sterilized and subjected to lengthy storage in contact with food while providing excellent performance as a protective coating.

Comparison Example 3

Pigmented Coating

Figure 6:
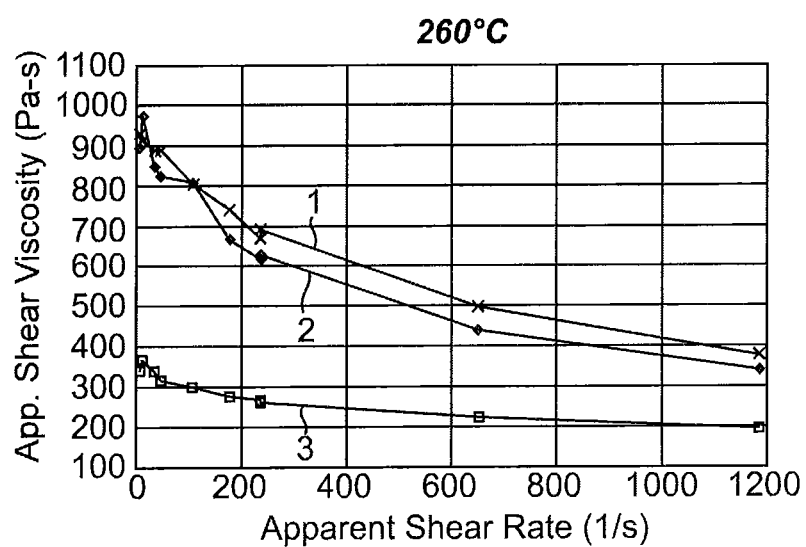
FIG. 6 is a graph of apparent shear viscosity vs. apparent shear rate at 260° C. for a filled thermoplastic polymer and for two solid state polymerized thermoplastic polymer blends, as employed in Comparative Example 3.

Using an extruder, 40 wt. % TiONA™ 188 Titanium Dioxide (from Millennium Chemicals) was pre-compounded into 60 wt. % KOSA 1101E CPET to provide a white version of the middle layer employed in Example 2. The pre-compounding step caused a substantial decrease in melt viscosity for the resulting filled polymer blend. The filled polymer blend was formed into pellets, allowed to crystallize, dried to a moisture value less than 50 ppm (by Karl-Fischer analysis) and tested for melt viscosity at 260° C. The results are set out in FIG. 6, which shows viscosity versus shear curves for the 60% KOSA 1101E CPET+40 titanium dioxide middle layer (curve 3), for the 75% KOSA 1101E CPET+25% EASTAR 6763 PETG top layer (curve 1), and for the 25% KOSA 1101E CPET+75% EASTAR 6763 PETG bottom layer (curve 2). The data shows that a very substantial reduction in the middle layer melt viscosity occurred during the pre-compounding process and that the melt viscosity of the pre-compounded top and bottom layers would be well above that of the filled KOSA 1101E CPET middle layer. It would be difficult to carry out successful coextrusion of these three layers without encountering film forming or application deficiencies.

Example 3

Figure 7:
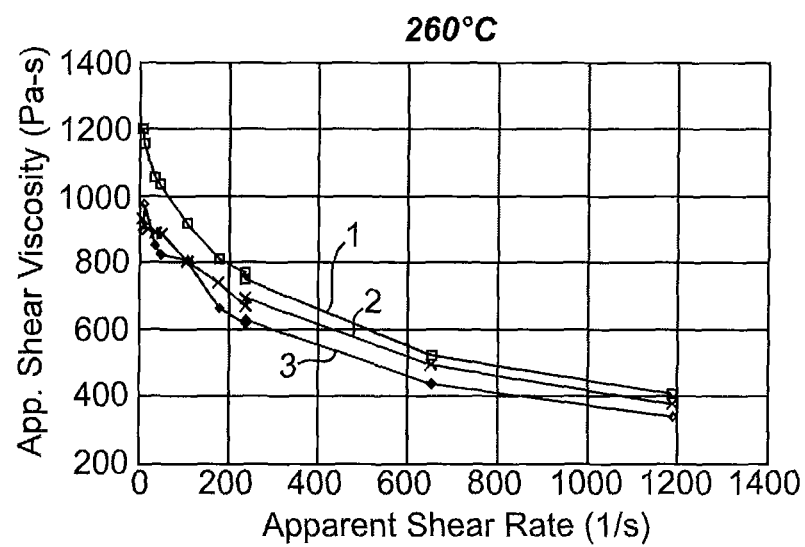
FIG. 7 is a graph of apparent shear viscosity vs. apparent shear rate at 260° C. for the thermoplastic materials shown in FIG. 6 after the filled thermoplastic polymer has been solid state polymerized.

Three Layer Coextrusion System with Solid State Polymerized Pigmented Middle Layer Using the method of Example 1, the Comparative Example 3 pelletized pre-compounded middle layer composition was subjected to solid state polymerization for 16 hours at 190° C. under a vacuum of about 760 mm Hg. The resulting solid state polymerized filled polymer blend was tested for melt viscosity at 260° C. The results are set out in FIG. 7, which shows viscosity versus shear curves for the solid state polymerized 60% KOSA 1101E CPET+40% titanium dioxide middle layer (curve 1), for the solid state polymerized 75% KOSA 1101E CPET+25% EASTAR 6763 PETG top layer (curve 3), and for the solid state polymerized 25% KOSA 1101E CPET+75% EASTAR 6763 PETG bottom layer (curve 2). The data shows that the melt viscosities of the solid state polymerized top and bottom layer blends closely match the melt viscosity of the pigmented middle layer, and that simultaneous coextrusion of all three layers together should be successful.

Various modifications and alterations of this invention will be apparent to those skilled in the art without departing from this invention. It should therefor be understood that this invention is not limited to the illustrative embodiments set forth above.

I claim:

1. A process for applying an adherent multilayer coating to a substrate comprising:
   a) providing a first thermoplastic polymer whose melt viscosity has a given value at a chosen temperature and extrusion rate;
   b) providing a second thermoplastic polymer advanceable by solid state polymerization and having a melt viscosity at the chosen temperature and extrusion rate sufficiently unlike the given value so that the first and second thermoplastic polymers can not be coextruded;
   c) blending the second thermoplastic polymer with at least one dissimilar thermoplastic polymer;
   d) solid state polymerizing the resulting blend to provide a modified polymer alloy whose melt viscosity at the chosen temperature and extrusion rate is sufficiently close to the given value so that the modified polymer alloy and the first thermoplastic polymer may be coextruded, wherein the modified polymer alloy has a melt viscosity within about ±15% of the first thermoplastic polymer at temperatures of about 200-300° C. and shear rates of about 50-500 l/s; and
   e) coextruding a layer of the modified polymer alloy and a layer of the first thermoplastic polymer onto a metal substrate to form a coated substrate having an adherent multilayer coating on the substrate.

2. A process according to claim 1 wherein the second thermoplastic polymer comprises a condensation polymer.

3. A process according to claim 1 wherein the second thermoplastic polymer comprises an alkyd.

4. A process according to claim 1 wherein the dissimilar thermoplastic polymer is advanceable by solid state polymerization.

5. A process according to claim 1 wherein the dissimilar thermoplastic polymer is not advanceable by solid state polymerization.

6. A process according to claim 1 wherein the second thermoplastic polymer comprises a polyester and the dissimilar thermoplastic polymer comprises a copolyester.

7. A process according to claim 1 wherein the second thermoplastic polymer comprises polyethylene terephthalate, the dissimilar thermoplastic polymer comprises a copolyester and the modified polymer alloy has greater melt viscosity than that of the blend before solid state polymerization.

8. A process according to claim 1 wherein the modified polymer alloy has a melt viscosity within about ±10% of the first thermoplastic polymer at temperatures of about 200-300° C. and shear rates of about a 50-500 l/s.

9. A process according to claim 1 wherein the modified polymer alloy has a melt viscosity within about ±5% of the first thermoplastic polymer at temperatures of about 200-300° C. and shear rates of about 50-500 l/s.

10. A process according to claim 1 comprising coextruding onto the substrate a first layer containing polyethylene terephthalate and a copolyester, a second layer containing polyethylene terephthalate, and a third layer containing polyethylene terephthalate and a copolyester.

11. A process according to claim 1 further comprising fabricating the coated substrate into a container.

12. A process according to claim 11 wherein the adherent layer is an interior coating on the container.

13. A process according to claim 12 wherein the interior coating is suitable for storage in contact with food.

14. A process according to claim 1 wherein the substrate comprises steel.

* * * * *